Nov. 18, 1924.
D. H. VAN HOVE
1,515,711
UPHOLSTERY UNIT FOR VEHICLE BODIES
Filed Jan. 3, 1924
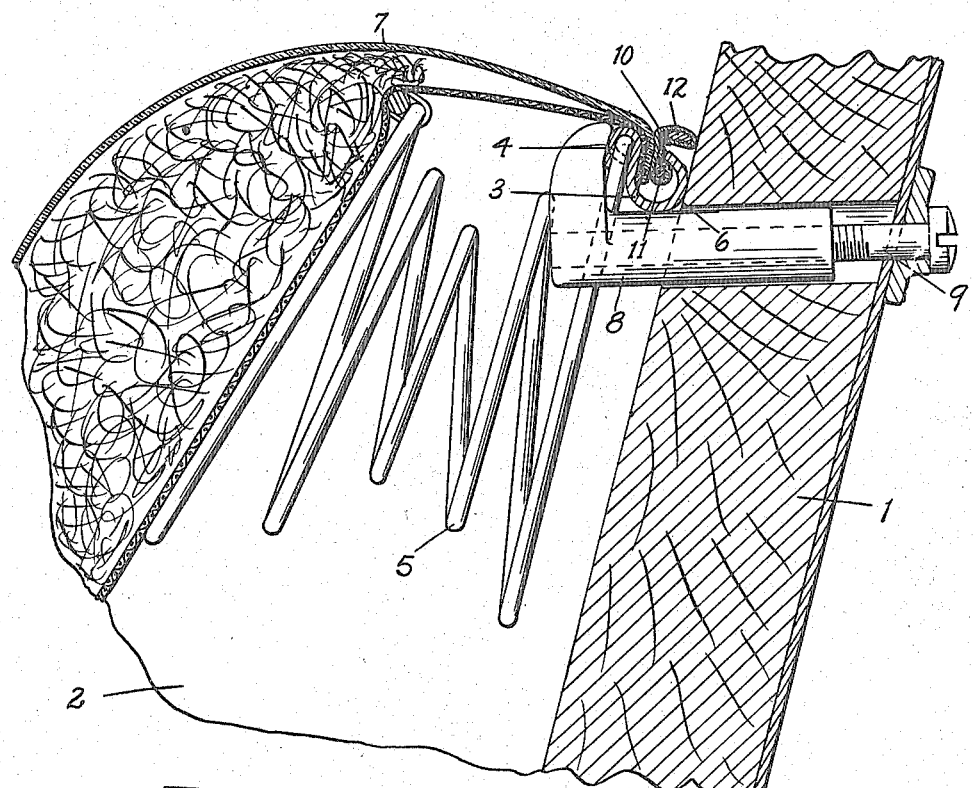
Fig. I
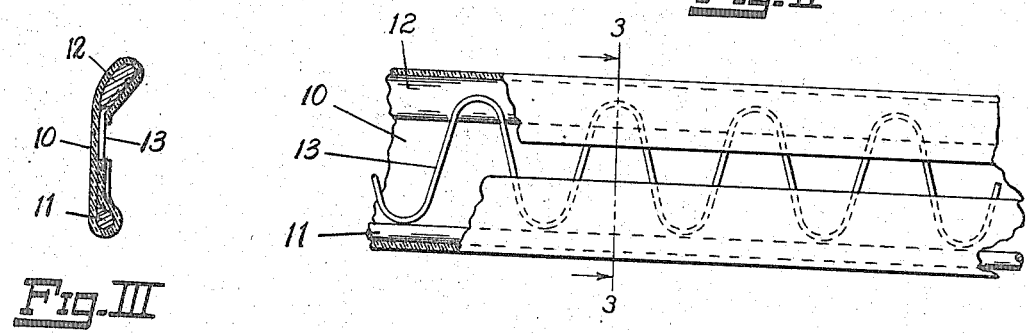
Fig. III
Fig. II
INVENTOR
Desire H. Van Hove
BY
Chappell & Earl
ATTORNEYS Patented Nov. 18, 1924.

1,515,711

UNITED STATES PATENT OFFICE.

DESIRE H. VAN HOVE, OF DETROIT, MICHIGAN, ASSIGNOR TO L. A. YOUNG INDUSTRIES, INCORPORATED, OF DETROIT, MICHIGAN.

UPHOLSTERY UNIT FOR VEHICLE BODIES.

Application filed January 3, 1924. Serial No. 684,183.

*To all whom it may concern:*

Be it known that I, DESIRE H. VAN HOVE, a citizen of the United States, residing at Detroit, county of Wayne, State of Michigan, have invented certain new and useful Improvements in Upholstery Units for Vehicle Bodies, of which the following is a specification.

This invention relates to improvements in upholstery units for vehicle bodies.

The main object of this inventon is to provide an improved upholstery unit for vehicle bodies and the like, such for instance as the back and side cushions, which may be clamped against the sides of the vehicle and has a finished appearance, the joint between the cushion and the body being effectively closed.

A further object is to provide a structure having these advantages which is very economical to produce and easily applied to the vehicle.

Objects pertaining to details and economies of construction of my improvements will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this application, in which:

Fig. I is a detail view partially in vertical section of a cushion or upholstery unit embodying the features of my invention in operative relation to the vehicle body or other support.

Fig. II is a detail inside view of the preferred form of finishing strip employed in my improved upholstery unit.

Fig. III is a cross section on a line corresponding to line 3—3 of Fig. II, taken looking in the direction of the arrows.

Similar numerals of reference indicate similar parts in all of the views.

Referring to the drawing, 1 represents a vehicle body and 2 an upholstery unit embodying the features of my invention.

This upholstery unit in the embodiment illustrated comprises a border frame 3 of S cross section providing an inwardly facing channel 4 constituting a supporting member for the upholstery spring as 5, the spring being clamped within the channel and an outwardly facing channel 6 constituting a means for securing the upholstery covering 7 to the frame, the edge of the covering being clamped within the channel 6 as shown in Fig. I.

The cushion or upholstery unit is clamped against the body by means of the clamping member 8 which engages the frame, a screw 9 coacting with the clamping member drawing the frame firmly against the body. This supporting or clamping means is that shown in my companion application filed concurrently herewith.

I provide a finishing strip 10 having a bead 11 secured in one edge and a bead 12 secured in its other edge by turning the edges of the strip inwardly over the beads and stitching or otherwise securing.

One edge of this strip is secured in the channel 6 at the edge of the upholstery covering so that the finishing strip is secured to the frame throughout by projections so that it may bend rearwardly with its edge against the body as shown in Fig. I. To secure it in this position I provide a retaining member 13 formed of wire bent into a zig-zag form, the bight portions of the wire being secured beneath the inturned edges of the strip. The clamping channel engages this wire along its edge so that it is supported for bending and may be bent over the frame the wire retaining the strip in its adjusted position as shown in Fig. I.

This provides a very efficient and economical finish or joint closing means and a covering for the frame.

I have illustrated and described only such parts of an upholstery unit and vehicle body or support as seems to me necessary to an understanding of my improvements.

I have illustrated an embodiment which I have found very practical. While I contemplate other embodiments and adaptations I have not illustrated the same as it is believed that the disclosure made will enable those skilled in the art to embody or adapt my improvements as may be desired.

Having thus described my invention what I claim as new and desire to secure by Letters Patent is:

1. The combination with a vehicle body of an upholstery unit comprising a border frame having an outwardly facing upholstery channel, an upholstery covering having its edge secured in said channel, means for clamping said upholstery covering to said body, and a finishing strip having one edge clamped with said upholstery covering within said border frame channel, the other being free to be folded over the border frame, said finishing strip having a longitudinally disposed zig-zagged wire secured on its inner side and clamped by said frame, said wire being bendable and constituting means for retaining said finishing strip in its adjusted position with its outer edge against the vehicle body.

2. The combination with a vehicle body of an upholstery unit comprising a border frame having an outwardly facing upholstery channel, an upholstery covering having its edge secured in said channel, means for clamping said upholstery covering to said body, and a finishing strip having one edge clamped with said upholstery covering within said border frame channel, the other being free to be folded over the border frame, said finishing strip having a bendable retaining member on its inner side for retaining it in its adjusted position with its outer edge against the vehicle body.

3. An upholstery unit comprising a border frame having an outwardly facing upholstery securing channel, an upholstery covering having its edge secured in said channel, and a finishing strip having one edge clamped within said channel with said covering with the other projecting, said strip having longitudinally disposed zig-zagged bendable wire secured on the inner side thereof whereby the finishing strip is retained in its adjusted position relative to said frame.

4. An upholstery unit comprising a border frame having an outwardly facing upholstery securing channel, an upholstery covering having its edge secured in said channel, and a finishing strip having one edge clamped within said channel with said covering and the other projecting, said strip having a bendable wire retaining means secured thereto whereby the finishing strip is retained in its adjusted position relative to said frame.

5. An upholstery unit comprising a border frame having an outwardly facing upholstery securing channel, an upholstery covering having its edge secured in said channel, and a finishing strip having one edge clamped within said channel with said covering and the other projecting, said strip having a reinforcing and retaining means incorporated therewith and clamped by said channel member whereby the finishing strip is retained in its adjusted position relative to said frame.

In witness whereof, I have hereunto set my hand.

DESIRE H. VAN HOVE. [L. S.]